Patented Nov. 13, 1923.

1,474,029

UNITED STATES PATENT OFFICE.

ISAAC F. HARRIS, OF TUCKAHOE, NEW YORK.

VITAMINE SOLUTION.

No Drawing. Application filed December 26, 1919. Serial No. 347,501.

*To all whom it may concern:*

Be it known that I, ISAAC F. HARRIS, a citizen of the United States, and a resident of Tuckahoe, Westchester County, State of New York, have invented an Improvement in Vitamine Solutions, of which the following is a specification.

My invention relates to "vitamine" preparations, particularly in liquid form, and aims to provide a liquid "vitamine" preparation which shall be stable, pure and uniform, and which shall be free from undesirable or harmful by-products and diluents. It is a further object of the present invention to provide a simple and certain method of rendering stable and uniform aqueous solutions of "vitamine" bodies of the character referred to above.

By way of example, I shall describe illustrative embodiments of the product and method of my invention in the accompanying specification, it being understood that the following detailed descriptions of such illustrative embodiments are merely for purposes of illustration, and that the invention is not limited to such illustrative embodiments.

For my "vitamine" body I use a water-soluble "vitamine" substance, such, for example, as a "vitamine" derived from yeast cells, more particularly the "vitamine" body described and claimed in my copending application, Serial No. 347,503, filed December 26, 1919.

This "vitamine" substance is a light, yellow-brown, very hygroscopic powder, having an odor and taste similar to extract of beef. It is readily soluble in cold water, producing a perfectly clear solution. It is freely soluble in 52% ethyl alcohol, but is less soluble in ethyl alcohol stronger than 80%, and substantially insoluble in absolute alcohol. Its aqueous solutions are light brown to dark brown, according to the concentration of the solution. Its solutions have a taste similar to extract of beef and have other properties of a mixture of peptones, propeptones and amino acids. It is substantially free from coagulable proteins and gives reactions for the amino groups, but does not give the "biuret" reaction. Solutions of this product give copious precipitates with phospho-tungstic acid, which, however, does not precipitate everything from the solution. Its aqueous solutions are also partly precipitated by solutions of barium hydroxide, silver nitrate, mercuric chloride or lead acetate. The dry powder, when burned, leaves about 12–15% of ash.

One method of preparing the foregoing "vitamine" substance as set forth in my copending application referred to above comprises, briefly, boiling said cells with water acidified with about one percent of acetic acid, filtering, drying the filtrate in vacuo and at a low temperature, thereafter extracting the dried product with an aqueous solution of ethyl alcohol of about 52% strength, filtering, and thereafter reducing the filtrate to dryness, extracting this dry mass with 80% to 90% ethyl alcohol, filtering, and dehydrating the precipitate with such anhydrous chemicals as ethyl alcohol, acetone and ether.

This "vitamine" body is readily soluble in water, but I have found that aqueous solutions of this and of other "vitamine" substances do not last long, but readily decompose and spoil.

I have discovered that if to an aqueous solution of a water-soluble "vitamine" there is added an organic preserving agent, such as ethyl alcohol, preferably about eighteen percent by volume of ethyl alcohol, a solution is obtained which possesses unexpectedly superior lasting qualities, the solution being very stable and of a uniform nature so as to be readily and conveniently administered to patients.

I have discovered that the presence of the preservative agent, such as the ethyl alcohol, especially in the amount set forth above, has no harmful action of any sort upon the "vitamine" body, but acts solely as a beneficial preservative agent. The addition of the alcohol, furthermore, does not render the aqueous solution less clear and permanent, the solution remaining of a yellowish-brown color throughout, the color increasing in density as the concentration of the solution in "vitamine" substance increases.

What I claim is:

1. A composition of matter comprising an aqueous solution of a biologically active "vitamine" body containing an amount of ethyl alcohol sufficient to exercise a substantial preservative action upon said "vitamine" body.

2. A composition of matter comprising an aqueous solution of a biologically active "vitamine" body containing about eighteen percent of ethyl alcohol.

3. A composition of matter comprising an aqueous solution of a biologically active "vitamine" body, derived from living yeast cells, containing ethyl alcohol sufficient to exercise a substantial preservative action upon said "vitamine" body.

4. A composition of matter comprising an aqueous solution of a biologically active "vitamine" body, derived from living yeast cells, containing about eighteen percent of ethyl alcohol.

In testimony whereof, I have signed my name to this specification this 24th day of December, 1919.

ISAAC F. HARRIS.